(No Model.)
J. FLINNER.
GATE.
No. 384,750.  Patented June 19, 1888.
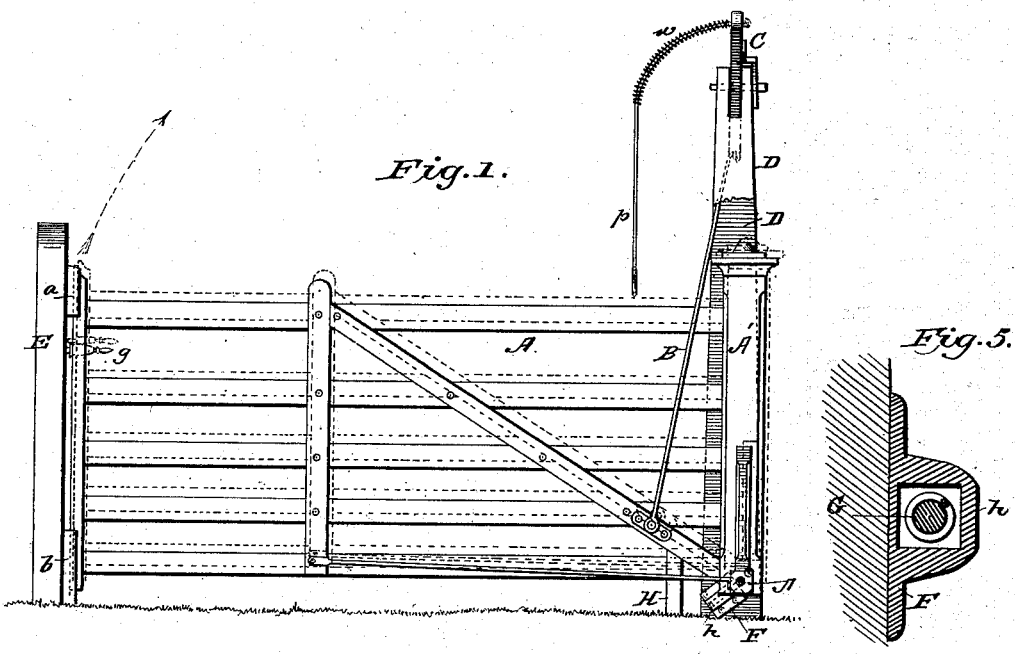
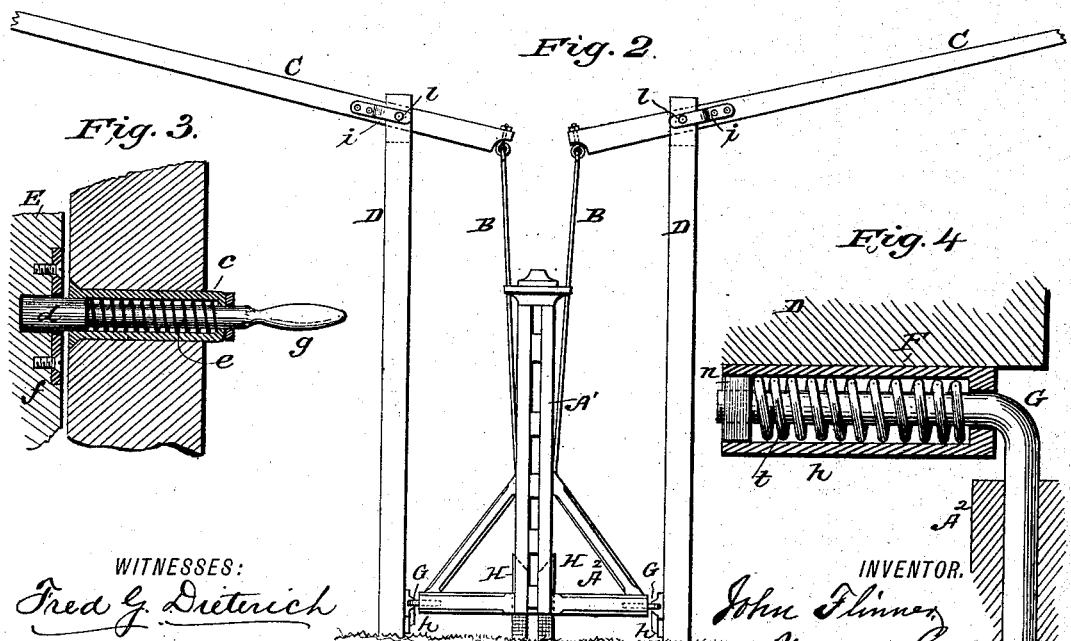
WITNESSES:
Fred G. Dieterich
Edw. W. Byrn
INVENTOR.
John Flinner
by Munn & Co.
ATTORNEY

UNITED STATES PATENT OFFICE.

JOHN FLINNER, OF BOLING, KANSAS.

GATE.

SPECIFICATION forming part of Letters Patent No. 384,750, dated June 19, 1888.

Application filed March 16, 1888. Serial No. 267,419. (No model.)

*To all whom it may concern:*

Be it known that I, JOHN FLINNER, of Boling, in the county of Leavenworth and State of Kansas, have invented a new and useful Improvement in Gates, of which the following is a specification.

My invention is in the nature of an improved gate of that class which is hinged about a horizontal axis at one end and at its lower corner, so as to rise vertically about this center, and is connected by rods with levers mounted upon posts upon opposite sides of the gate, whereby the gate is operated from the passing vehicle without the necessity of alighting therefrom.

The improvements consist in the peculiar construction and arrangement of the hinges and lever-connections, as will be hereinafter fully described with reference to the drawings, in which—

Figure 1 is a side elevation, partly broken away, and showing in dotted lines the initial movement of the gate in opening. Fig. 2 is an end elevation, and Figs. 3, 4, and 5 are details.

A represents the gate, which, by connecting-rods B and levers C, mounted upon posts D, is arranged to be thrown vertically out of the roadway by a movement about an axis at its lower end portion in a well-known manner.

E is the gate-post proper, against which the free end of the gate locks, and which gate-post has at its top and bottom side strips, $a$ and $b$, on both sides, between which the end of the gate descends and is locked as against lateral movement. In the vertical bar of the gate at this end is bored a hole, into which is forcibly driven and held by friction a flanged thimble, $c$, Fig. 3, in which is contained a locking-bolt, $d$, which is forced forward by a spiral spring, $e$, within. This locking-bolt seats itself in a hole formed in a lock-plate, $f$, attached to the post E between strips $a\ a$, and prevents the gate from being lifted up by hogs or small live stock. The stem $g$ of the locking-bolt projects entirely through the gate-bar, so that it may be seized by hand to withdraw the bolt.

For withdrawing the bolt through the working-levers a slip movement is given to the entire gate by a peculiar construction of compound hinge, hereinafter described. The hinged end of the gate is constructed with a strong post, A', braced to and connected with an axial bar, A², which stands at right angles to the plane of the gate and at the lower end corner. This axial bar A² is connected to the post D by a peculiar construction of compound hinge. This hinge consists of a plate, F, having a barrel, $h$, in it, which plate is screwed to the inner sides of the lever-posts D. These plates are fastened to the posts in inclined position, so that the barrel has its rear end or end farthest from the gate-post E higher than the other end. The other member of the compound hinge is the bent rod G, one end of which enters the axial bar A², as in Fig. 4, and forms a journal at each end, upon which the gate turns, while the other end of the rod G is bent at right angles and enters the barrel of plate F and forms a sliding connection, which causes the gate to ride upwardly and to the rear when lifted, so that when the gate is raised by the levers its first or initial movement is a retractile one, riding bodily upwardly and away from the gate-post E, as shown by dotted lines, Fig. 1, far enough to allow the lock-bolt to pass out of its hole, at which time a continuation of the lifting strain causes the gate to rise, as indicated by the arrow, and turn upon its journals or the hinge formed by the axial bar A² and its bent rod G.

In order that the gate may be assisted to move forward on its sliding connection in closing, a spiral spring, $t$, is arranged in the barrel of the hinge and presses against a head or nut, $n$, as shown in Fig. 4. This head may be made square, so as to fit in a square hole in the barrel, (see Fig. 5,) so as to prevent the other end of the bent rod from getting out of an axial line. To the outer end of each lever there is attached the usual pull-cord, $p$. This pull-cord I connect to the lever by a semi-stiff connection—i. e., a connection which does not allow the cord to hang down vertically, but causes it to be projected more nearly into the path of the passing vehicle. It frequently happens with the simple cord that it is blown to one side by the wind, so that it cannot be reached from the vehicle. This difficulty cannot be overcome by throwing the lever more into the path of the vehicle, for the reason that it is liable to be caught and broken by a load of hay or other projection from the loaded wagon. With my semi-flexible and semi-stiff connection the rope is held in easy reach of the driver, and yet a load of hay striking against it does no damage. This semi-stiff connection, as shown, is made by a closely-wound spiral wire, *w*, wound around the rope; but it may be made by a flexible rubber hose, or by an elastic strip or withe lashed to or incorporated in the rope.

To each of the levers is attached a metal bracket, *i*, which connects with the axial bolt *l*, which forms the fulcrum of the lever and serves as a brace to strengthen and steady the levers against lateral strain.

H is a forked seat, into which the gate drops when closed. This seat is located near the hinge, and relieves the hinges of all strain caused by lateral pressure against the gate.

This gate is simple in its construction, certain in its operation, and is not affected by rain, nor liable to derangement from wear.

Having thus described my invention, what I claim as new is—

1. The combination, with the working-levers and connecting-rods, of a vertically-tilting gate and a compound hinge for said gate having an axis upon which the gate tilts, and a sliding adjustment to permit a retractile initial movement of the gate, substantially as and for the purpose described.

2. The combination, with the gate and its posts, of the compound hinge composed of plate F, with barrel *h*, the bent rod G, having a head or nut, *n*, and a spiral spring, *t*, the said gate being arranged to turn upon the journal formed by the bent rod.

3. The combination, with the working-levers, in a lever-gate, and the rope for operating them, of a flexible semi-stiff connection for projecting the rope into easy reach from the path of the vehicle, substantially as and for the purpose described.

The above specification of my invention signed by me in the presence of two subscribing witnesses.

JOHN FLINNER.

Witnesses:
EDWD. W. BYRN,
ADAM FLINNER.